United States Patent [19]
Dietrich et al.

[11] Patent Number: 5,739,824
[45] Date of Patent: Apr. 14, 1998

[54] METHOD AND APPARATUS FOR CONVEYING HIGHER-DIMENSIONAL TABULAR INFORMATION TO PEOPLE USING LOWER-DIMENSIONAL OUTPUT DEVICES

[75] Inventors: Brenda Lynn Dietrich; Walter C. Dietrich, Jr., both of Yorktown Heights; Elizabeth Jodi Poole, Garrison; John Peter Fasano, Briarcliff Manor; Jung-Mu Tang, South Salem, all of N.Y.

[73] Assignee: International Business Machines Corporation, Armonk, N.Y.

[21] Appl. No.: 781,078

[22] Filed: Jan. 9, 1997

Related U.S. Application Data

[63] Continuation of Ser. No. 386,841, Feb. 10, 1995, abandoned.

[51] Int. Cl.$^6$ ........................................ G06F 3/14
[52] U.S. Cl. ...................... 345/440; 345/113; 395/764; 395/770
[58] Field of Search ...................... 395/764, 765, 395/790, 140, 141, 348, 349, 770; 345/113, 117, 133

[56] References Cited

U.S. PATENT DOCUMENTS

| | | | |
|---|---|---|---|
| 4,158,837 | 6/1979 | Zahorsky | 345/203 |
| 5,317,686 | 5/1994 | Salas et al. | 395/157 |
| 5,339,390 | 8/1994 | Robertson et al. | 395/157 |
| 5,408,596 | 4/1995 | Nonaka et al. | 395/140 |
| 5,440,681 | 8/1995 | Kudo | 395/161 |
| 5,463,731 | 10/1995 | Diec et al. | 395/161 |
| 5,473,747 | 12/1995 | Bird et al. | 395/161 |
| 5,499,368 | 3/1996 | Tate et al. | 395/600 |
| 5,555,354 | 9/1996 | Strasnick et al. | 395/127 |
| 5,557,716 | 9/1996 | Oka et al. | 395/140 |

OTHER PUBLICATIONS

Bertin, "Semiology of Graphics", The University of Wisconsin Press, 1983, pp. v–13 and 191–231.

*Primary Examiner*—Heather R. Herndon
*Assistant Examiner*—Stephen Hong
*Attorney, Agent, or Firm*—Stephen C. Kaufman

[57] ABSTRACT

The invention discloses an apparatus for conveying higher dimensional tabular information to people using a lower dimensional output device. The apparatus is such that original information in the higher dimensional expression can be mapped to the lower dimensional output device, while preserving invariant a content and relationship of the original information.

3 Claims, 9 Drawing Sheets

64

| | 1/1/89 | 1/1/90 | 1/1/91 | 1/1/92 | 1/1/93 | 1/1/94 |
|---|---|---|---|---|---|---|
| Collins, Tom | 120/80 | 118/78 | 120/76 | 130/82 | 130/84 | 134/84 |
| Johnson, Jane | 110/70 | 112/73 | 106/75 | 120/80 | 124/73 | 130/78 |
| Jones, Susan | 100/70 | 102/68 | 106/72 | 110/74 | 112/78 | 112/80 |
| Smith, Frank | 130/75 | 132/70 | 128/80 | 134/75 | 120/70 | 110/60 |
| Walters, Fred | 122/76 | 136/82 | 124/74 | 140/84 | 126/72 | 145/88 |
| Williams, Mary | 110/75 | 112/74 | 114/72 | 145/80 | 120/76 | 126/72 | weight: ok /problem
*female*  male    pulse: ok /problem asian  black  white    cholesterol  <150   150-159  160-169  >170

FIG. 1.a

STEP 6

| DATE | 1/1/89 | 1/1/90 | 1/1/91 | 1/1/92 | 1/1/93 | 1/1/94 |
|---|---|---|---|---|---|---|
| SUSAN JONES | 110 | 112 | 114 | 116 | 118 | 120 |
| TOM COLLINS | 150 | 150 | 150 | 170 | 170 | 170 |
| FRED WALTERS | 165 | 180 | 160 | 190 | 155 | 200 |
| MARY WILLIAMS | 100 | 100 | 100 | 140 | 110 | 110 |
| FRANK SMITH | 180 | 180 | 180 | 170 | 160 | 150 |
| JANE JOHNSON | 100 | 95 | 80 | 95 | 95 | 95 |

| | 1/1/89 | 1/1/90 | 1/1/91 | 1/1/92 | 1/1/93 | 1/1/94 |
|---|---|---|---|---|---|---|
| Collins, Tom | 120/80 | 118/78 | 120/76 | 130/82 | 130/84 | 134/84 |
| Johnson, Jane | 110/70 | 112/73 | 106/75 | 120/80 | 124/73 | 130/78 |
| Jones, Susan | 100/70 | 102/68 | 106/72 | 110/74 | 112/78 | 112/80 |
| Smith, Frank | 130/75 | 132/70 | 128/80 | 134/75 | 120/70 | 110/60 |
| Walters, Fred | 122/76 | 136/82 | 124/74 | 140/84 | 126/72 | 145/88 |
| Williams, Mary | 110/75 | 112/74 | 114/72 | 145/80 | 120/76 | 126/72 | weight: ok / problem
pulse: ok / problem no hatching / 150-159 / 160-169 / >170
cholesterol <150 female / male
asian / black / white

METHOD AND APPARATUS FOR CONVEYING HIGHER-DIMENSIONAL TABULAR INFORMATION TO PEOPLE USING LOWER-DIMENSIONAL OUTPUT DEVICES

This is a continuation of application Ser. No. 08/386,841, filed Feb. 10, 1995, now abandoned.

FIELD OF THE INVENTION

Decision making and other complex tasks may require a synchronous assimilation of information, which assimilation may be constrained by a medium through which the information is to be conveyed. This invention discloses a method and apparatus for conveying nonredundant information, without loss of content, to a selected information medium, by defining and/or exploiting unused or under-used aspects or elements of the selected information medium.

BACKGROUND OF THE INVENTION

The purview of this invention extends to computer-human interfaces, and in particular, to displaying information to human users. Now, on the one hand, a complete understanding of information typically requires that users consult many pieces of interrelated information, and that they retain and synthesize this information through their own memories. On the other hand, an information provider frequently desires to provide multiple sets of information at once, so that the information and the relationships revealed by it can be Fully comprehended. In this context, we note that many kinds of data can be represented by tables, and frequently the totality of information to be displayed requires two or more tables.

SUMMARY OF THE INVENTION

Most current display devices (for example, cathode ray tubes and liquid crystal displays) are two-dimensional. A common way to display information on such two-dimensional display devices is to arrange the information in a table consisting of rows and columns. This use of tables is the basis for all spreadsheet applications (for example, LOTUS 1-2-3).

As a specific example, one may use a two-dimensional table to display medical information for a set or patients collected over a number of dates, so that each row of the table may be used to display information about a specific patient, and each column of the table may be used to display information collected on a specific date. If distinct types of information, such as weight and height, are to be displayed, the different types of information may be displayed in separate, adjacent tables: weight in one table, height in a second. With this display method, relationships between the values taken by the different data (e.g., between a person's weight and height) may become difficult for most users to see. This method also requires more display area than either individual table.

A second method of presenting two tables of data is to present one table at a time and provide the user with a means of switching (quickly) from one table to another, such as clicking on a mouse button or hitting a particular key. This method requires the amount of display area occupied by only one table, but the user can see only one set of data at a time. As with the previous method, when users view each set of data separately, it is typically difficult for them to discern relationships between the different sets of data.

Alternatively, multiple sets of data may be displayed in a single table by interspersing the rows or columns of the individual data tables. In the weight and height example, the data might be arranged in a table with one row for each patient and two adjacent rows for each date. For each patient-date combination, the weight can be displayed in the first of the two columns for the date, and the height can be displayed in the second of these two columns.

This type of arrangement may make it easier for the viewer to discern relationships between the two sets of data, but generally makes it difficult for the viewer to discern trends in either of the individual data sets. Also, because displaying the two data sets as a single table requires twice as many rows or columns as each individual table, the larger single table may not fit onto a single display screen or page, necessitating scrolling or flipping between pages. That is, the larger combined table displays less information from each table per unit of display area. For example, if 25 numbers from one table require one square inch of display, interleaving two tables only permits displaying about 12 numbers from each table in each square inch. Since output devices (such as screens and printers) with larger surface areas are bulkier and more expensive than ones with smaller areas, compact display representations of data are, in general, preferable.

We now return to our first (medical) example to develop some additional points. Here, each of the data types, weight and height ,is typically represented as integer or decimal numerals. Now, without some additional visual cue, it may be difficult for a viewer to determine easily whether any given value (e.g., 75) represents height (inches) or weight (pounds) without tracing the column up the table to the heading. On the other hand, if the data being displayed is of a mixed type, for example weight and occupation, typical users may find rows of alternating numbers and words distracting. In short, such an interleaved representation does not make effective use of human image recognition and processing capabilities.

As a final example, we cite U.S. Pat. No. 4,158,837, Information Display Apparatus, by J. T. Zahorsky in which a specific display apparatus (namely, a cursor) can provide a user with multiple pieces of information.

We have now discovered a novel method and apparatus for defining and exploiting a variety of aspects of display media for conveying to a viewer multiple sets of information simultaneously. A centerpiece of out discovery comprises displaying multiple two-dimensional tables or, more generally, information functions, on a two-dimensional display medium e.g., paper, cathode, ray tube, liquid crystal display, and the like. The discovery also encompasses methods that can be used to display multiple 1-dimensional tables on a 1-dimensional display medium e.g., ticker tape or multiple 3-dimensional tables on a 3-dimensional display medium e.g., stereo display screen or holograph, or in fact, for any integer n≧1, multiple n-dimensional tables on an m-dimensional display medium, m<n.

In a first aspect, the present invention includes a method comprising the steps of:

1) specifying n independent information dimensions, wherein each dimension comprises a parameter associated with data to be displayed in an m-dimensional display medium, m<n;

2) specifying k data functions declined on subsets of the n information dimensions, wherein each of the k data functions comprises a range of possible values;

3) associating at least one of the k functions with one or more aspects of the m-dimensional display medium, wherein each aspect comprises a range of possible values that can be displayed on that aspect;

and for each aspect mapping the range of the functions associated with that aspect to the range of values that can be displayed on that aspect on the m-dimensional display medium.

In a second aspect, the present invention includes apparatus comprising:

1) means for specifying n independent information dimensions, wherein each dimension comprises a parameter associated with data to be displayed in an m-dimensional display medium, m<n;

2) means For specifying k data functions defined on subsets of the n information dimensions, wherein each of the k data functions comprises a range of possible values;

3) means for associating at least one of the k functions with one or more aspects of the m-dimensional display medium, wherein each aspect comprises a range of possible values that can be displayed on that aspect;

and for each aspect 4) means for mapping the range of the functions associated with that aspect to the range of values that can be displayed on that aspect on the m-dimensional display medium.

The invention as defined can realize several important and significant advantages. For example, tile invention has a capability for enabling decision making based upon a synchronous assimilation of information, without appreciable constraint by a medium through which tile information may be conveyed. The invention, moreover, can convey a quantum of additional information ill the same visual space or data to which it relates. Additionally, the invention may be readily realized by both hardware and software developers. The invention subsumes further capabilities and advantages, to be noted below.

BRIEF DESCRIPTION OF THE DRAWINGS

The invention is illustrated in the accompanying drawing, in which.

DETAILED DESCRIPTION OF THE INVENTION

For the sake of pedagogy, a detailed description of the present invention develops by referencing an illustrative running example. The example subsumes tables comprising cells dedicated to conveying medical information.

As prelude to articulating specific detailed steps of the invention, we now set forth some preliminary, general considerations.

Preferably, each cell of a typical table has several aspects commonly used to convey information:

the name or label of the table, the row in which the cell is located, the column in which the cell is located, the contents of the cell—the data it contains, in numeric, textual, or graphical format (or any combination thereof).

For example, a cell of a table labeled "Patient Weight" located in a row labeled "Mary Johnson" and in a column labeled "Jan. 1, 1990" might contain the numeral "140."

We note that prior art recognizes and uses these aspects of table cells. Prior art also recognizes the following cell aspects, but does not use them to convey additional information:

the color of the contents of the cell, the color of the background of the cell, the border of the cell, the scale of the contents of the cell, the motion of the contents of the cell.

We note that prior art uses these aspects in various ways to display the information redundantly in a single table. Specifically, the aspects of content color, background color, border color, content scale, and content motion may be used to convey information already embodied in the cell contents or location.

For example, color is often used to highlight certain ranges of numeric data. In many tables, positive numeric data (numbers greater than or equal to 0) may be displayed in black, and negative numeric data (numbers less than 0) may be displayed in red. In such a case, the use of color enables the user to locate all of the negative values easily, but provides no additional information content, since the sign (positive or negative) of numeric values is already depicted in the representation of the number through a conventional use of the negative ("–") sign.

Another common use of color in tables is the use of alternating background colors on either the rows or the columns of the table. For example, cells in the even-numbered rows of many tables, particularly spreadsheets, have a white background, while the cells in the odd-numbered rows have a pale blue background. This use of color assists the viewer in determining to which row a given cell belongs.

The present invention uses cell aspects, such as background color, to convey information not already embodied in the content or location of a cell. Thus, different aspects of the cell may be used to convey different sets of information. This action permits information from multiple tables to be conveyed to the user in a single table.

Figure 1:
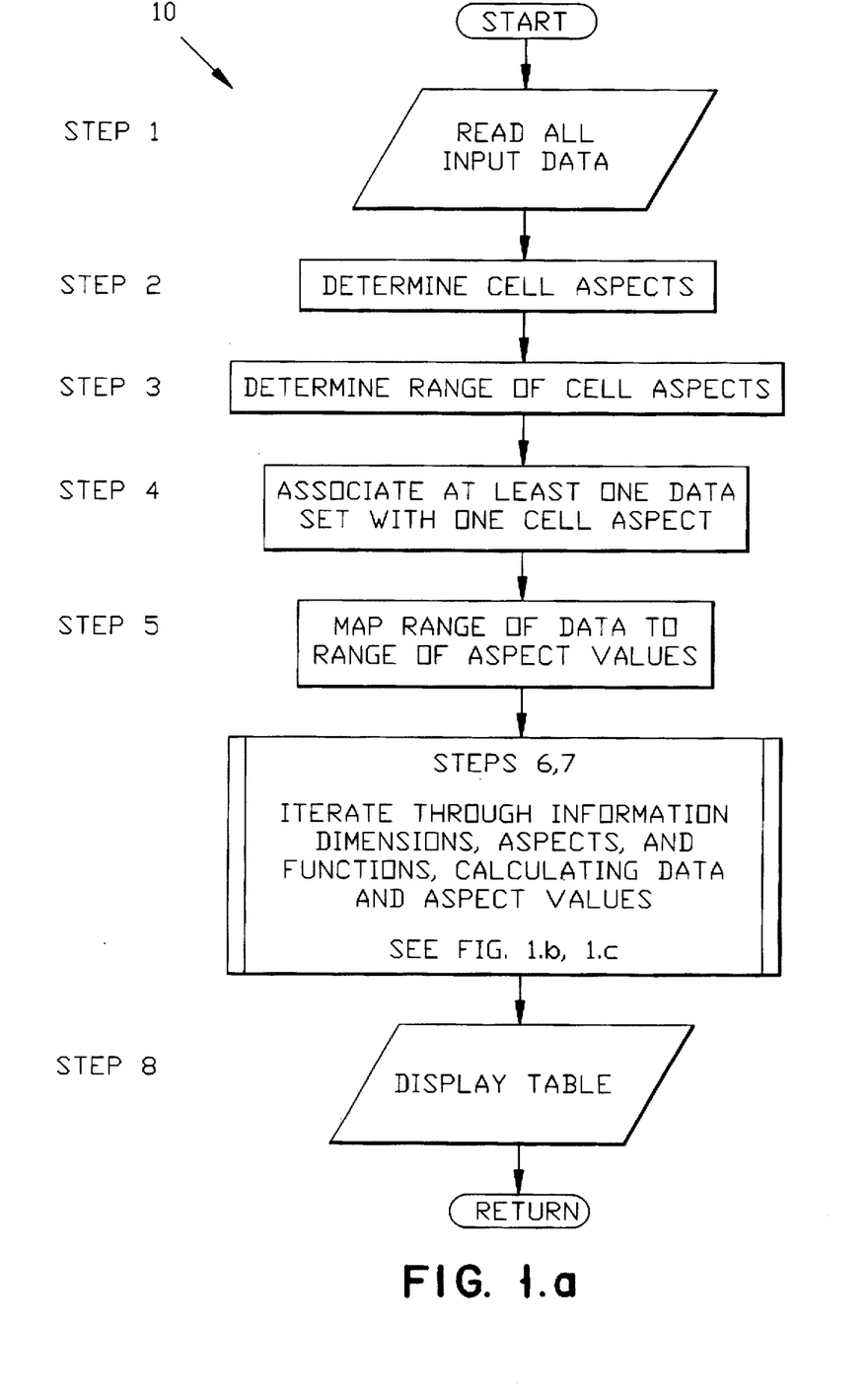
FIGS. 1a–c show a flowchart embodiment of preferred aspects of the method of the present invention.

Preferred basic steps of this invention, as shown in FIGS. 1a–c (numeral 10), are not set forth in overview, to be followed by further particulars on various individual steps.

STEP 1: Read all input data, comprising a range of each of the n information dimensions that define the data wherein the i-th information dimensions is a parameter with range de-noted by $l_i$;

specific data tables or data generating functions for defining k data sets $(f_1, f_2, \ldots, f_k)$ of n-dimensional information wherein the value in the k-th data set corresponding to a combination $x_1 \epsilon I_1, x_2 \epsilon I_2, \ldots x_n \epsilon I_n$ of values from within the parameter ranges is denoted by $f_k(x_1, x_2, \ldots, x_n)$.

STEP 2: Determine cell aspects, for example, from among the following:

Discrete row column cell content numerals, strings, pictures cell background distinguishable range of colors distinguishable range of greys distinguishable range of brightnesses where range is a subset of {entire range}–{cell foreground range} cell content/foreground
    distinguishable range of colors
    distinguishable range of greys
    distinguishable ravage of brightnesses where range is a subset of {entire range}–{cell background range}
cell face/font/size, where content is numeric or string
cell pen, where content is numeric or string for example, raised, indented, outline, fill
border pen for example, raised, indented, outline, fill
border pen color
    distinguishable range of colors
    distinguishable range of greys
    distinguishable range of brightnesses where range is a subset of {entire range}—{cell background range}
Continuous
    x coordinate (and dimensions)
    y coordinate (and dimensions)
    point color
    point brightness
    point pulse STEP 3: Determine ranges of cell aspects.

STEP 4: Associate at least one of the k sets of data with a cell aspect.

STEP 5: Map the range of data to be conveyed by a cell aspect to the range of values that can be displayed by that aspect.

STEP 6: For each cell in the n-dimensional table to be displayed, determine the data values to be conveyed by each aspect of that cell.

STEP 7: By applying the maps defined in STEP 5, determine the values to be displayed by each cell aspect.

STEP 8: Display the n-dimensional table comprising labeling information for each of the information axes;, an option legend describing the use of cell aspects and maps; the cell aspect values determined in step 7.

We note that the Steps 1, 2, 3, and 8 may be realized by artisans skilled in the techniques of data processing and graphical user interfaces, having regard to their own knowledge and the disclosure herein.

We now recall that STEP 4 comprises determining which sets of data are to be conveyed by each of the cell aspects. A preferred method, described here, specifies a default assignment of each table to a single aspect, according to the anticipated importance of that table's data to the user. For interactive applications, this method also allows the user to un-assign tables (those containing data that the user does not wish conveyed) or to re-assign tables from one aspect to another.

A preferred implementation of this interactive table design uses two scrollable list boxes, one containing the table names and the other containing the aspect names. The user may select a table name from the table name list box (for example, through use of a mouse or cursor). If that table is assigned to an aspect, that aspect is highlighted in the aspect list box. The user can then de-select a high-lighted aspect, resulting in the table being un-assigned to that aspect. The user can also assign a table to an aspect by selecting that aspect from the aspect list box.

Selection and de-selection of items from within list boxes, as techniques in-and-of themselves, are prior art techniques, implemented in many graphical user interfaces.

The present method allows multiple tables to be assigned to the same aspect, which is useful when the display medium permits only a small number of aspects per cell. This method also allows a single table to be assigned to 0 aspects; if a table is assigned to 0 aspects the information within that table will not be conveyed on the display. This method also allows a table to be assigned to more than one aspect. Assigning a table to more than one aspect is useful when each aspect can display only a small set of values. For example, if four different font sizes can be displayed, and 3 different flint weight (e.g., light, normal, bold) can be displayed, then these two different aspects in combination can convey 12 different values.

Figure 2:
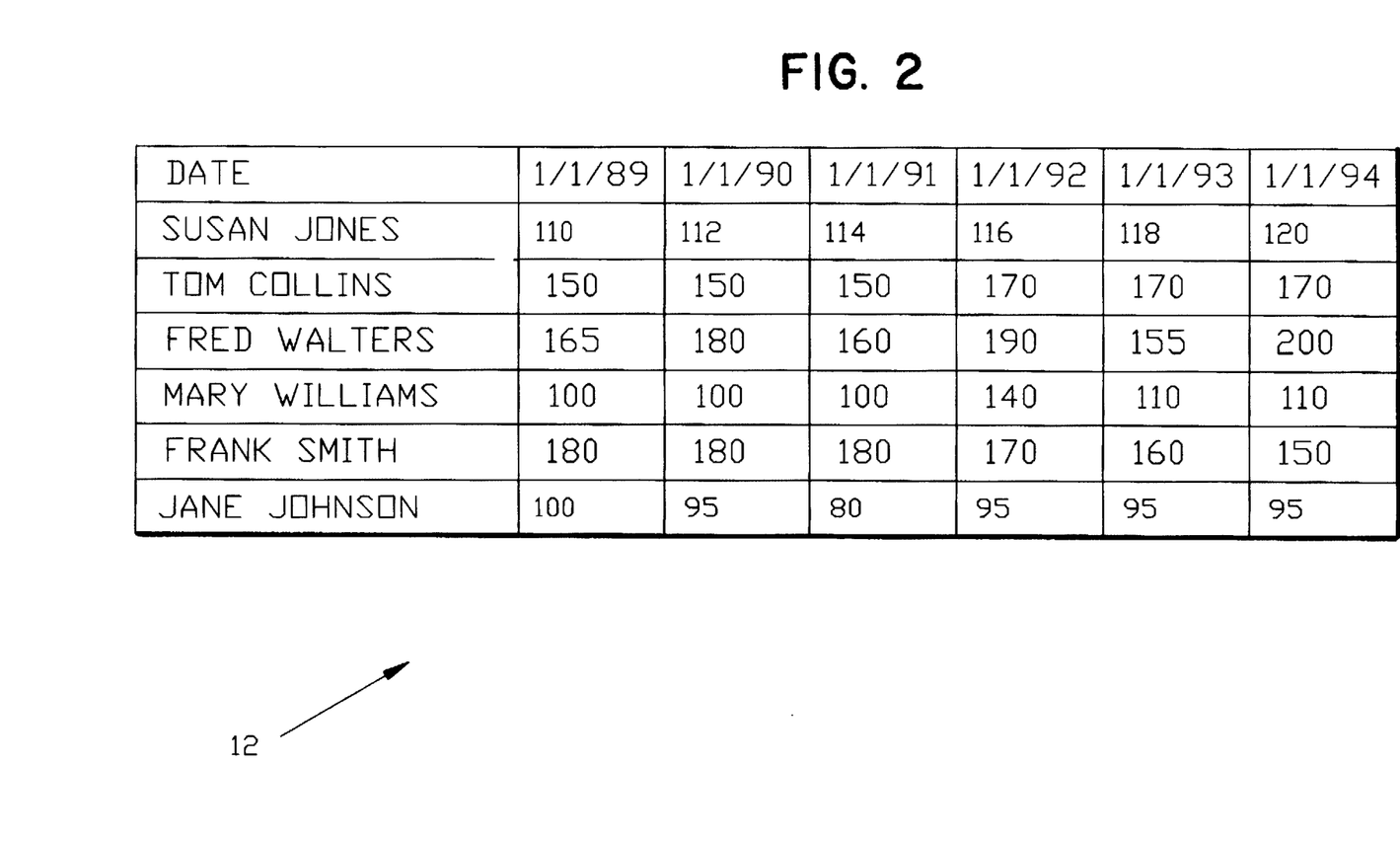
FIG. 2 shows a Table developed in accordance with an example illustrating the present invention.

Returning to our running example on patient data, information on both patient height and weight can be conveyed in a single table by, for example, using the font size to convey the patient's height, and the cell contents to convey the patient's weight. In this table, each row contains the data for one patient and each column contains the data for one date. The numeric value in a cell gives the patient's weight on that date, and the font used in the cell conveys information about the patient's height on that date. Patient height, given in inches, can be expected to span a large range. In our example data, the patient heights range from 60 inches to 71 inches. A typical display medium may be capable of displaying only 4 different font sizes (e.g., 8 points, 10 points, 12 points, 14 points) in each table cell. Therefore, the range of integers {60, 61, 62, . . . , 71} must be mapped to the 4 font sizes {8 points, 10 points, 12 points, 14 points}. In a table below, we use the mapping {60, 61, 62}→8 points
{63, 64, 65}→10 points
{66, 67, 68}→12 points
{69, 70, 71}→14 points A table in FIG. 2 (numeral 12) displays tile patient weight information explicitly as cell contents. It also conveys the patient height information through use of four different fonts.

We now recall that STEP 5 preferably comprises a method for mapping a range $R_d$ of data to a range $D_A$ of values that can be displayed by a set A of cell aspects. This invention specifies both a general method that can be applied to all finite data ranges, as well as several specific mappings that are appropriate for common classes of data.

The general method for mapping ranges of data to ranges of cell aspects can take advantage of prior art techniques for comparing complex data structures. See The Art of Computer Programming Volume 1: Fundamental Algorithms, Donald E. Knuth, Addison Wesley Publishing Company, Inc., Reading, Mass. 1973, Section 2.3 Trees, pp. 305–406. The prior art for comparing complex data structures traverses a data structure in a well-defined order, and ensures that two semantically identical data structures are found to be equal even if their respective parts are not stored (in the computer memory) in the same order. Each element $r \epsilon R_d$, is traversed as if tier comparison, and the relevant data parts (those parts that would be compared to the corresponding parts of another data structure by the comparison method) arc used in the computation of a binary number, as follows. The bits representing the relevant data may be stored in a bit-string in the order in which they are encountered in the traversal. This bit-string may be interpreted as a binary number, B(r). Thus two data elements, $r_1$, $r_2 \epsilon R_d$, can be mapped to the same binary number $B(r_1)=B(r_2)$ if and only if the comparison method finds $r_1$ and $r_2$ to be identical. Any finite set of data elements can be uniquely and unambiguously ordered using this method. It is important to note that this ordering method can be applied to any finite set $R_d$, of data, whether it is stored as tables, computed as functions of other data, or read from various input or storage sources.

Once the data $R_d$ has been ordered, for example by the method described above, the ordered data can be mapped to the values $D_A$ that can be displayed by the set A of cell aspects. Suppose that the set A of cell aspects can in combination display a range $D_A$ of N>0 different values. A preferred mapping of the data to the possible aspect values may be achieved by partitioning the ordered range of the data into N intervals, and assigning each interval to a unique value that can be displayed by the set of aspects. The intervals can be chosen so that they are "equal" in the underlying order, so that each contains approximately 1/N-th of the data elements, or so that a pre-specified distribution of data elements may be satisfied.

If the range $D_A$ has a natural order (for example font sizes are naturally ordered by their size), then it may be preferable to map the first interval of $R_d$ to the first value in $D_A$, the second interval in $R_d$ to the second value in $D_a$, and so forth.

In general, the intervals for an ordered set $R_d$ may be specified by the user, by the application program that is managing the displaying of the data, or may be calculated heuristically from the data itself. For the heuristic calculation, the data may be examined to determine the actual range. Since parameter ranges are finite, and each function specifics a single data element for each combination of elements from the parameter ranges, the range of each of the information functions is finite. Hence, the actual range of the data is finite. Various statistical approaches can be used to partition any finite ordered set into intervals. For example, if 10 intervals are desired by simple sorting the actual data elements, counting, and recording values, tile range can be partitioned into 10 intervals each containing (approximately) 1/10 of the data elements.

If a so-called "bell-curve" distribution of N elements into 5 intervals is desired, the actual data elements may be sorted. If tile objective is to distinguish the smallest and largest 5% of the data elements, and the middle 50% of the data elements, then the first interval may be determined by the values of the smallest element and the N/20-th smallest element, while the second interval may be determined by the values of the N/20+1-th smallest element and the N/4−1-th element. The middle interval $I_3$ is determined by the values of N/4-th smallest and N/4-th largest data elements. The fourth interval $I_4$ may be determined by the values of the N/4−1-th largest element and the N/20+1-th largest element, and the fifth interval $I_5$ may be determined by the value of the N/20-th largest element.

For certain cell aspects and certain classes of data, other mapping functions may be preferred. A short list of alternative mapping functions is now described by way of three examples.

EXAMPLE 1

If the range of the data consists of alpha-numeric strings of length≦h, and the data is to be displayed as cell contents, and the cell contents aspect can display alpha-numeric strings of length h, then the identity map can be used. That is, the data can be exactly displayed. The natural map is the identity map, re(x)=x for all x∈$R_d$. In Fact, the identity map can be used whenever $R_d \subset D_A$.

EXAMPLE 2

Often, $R_d$ is numeric data that is a priori known to lie within a specified finite range. For example, the range of patient height for a control group of healthy adults may be known to be contained within the 30 integers {56, 76, . . . , 85}. Suppose that the range of the aspect values is the 5 font sizes: 8 points, 10 points, 12 point, 14 points and 16 points. Then, a reasonable map may be obtained by partitioning the 30 integers into 5 disjoint sets of consecutive integers with these 5 sets containing 6 integers.

$I_1$={56, 57, 58, 59, 60, 61}
$I_2$={62, 63, 64, 65, 66, 67}
$I_3$={68, 69, 70, 71,72, 73}
$I_4$={74, 75, 76, 77, 78, 79}
$I_5$={80, 81,82, 83, 84, 85}.

The mapping is given by $$m(x) \begin{cases} 8 \text{ points if } x \in I_1 \\ 10 \text{ points if } x \in I_2 \\ 12 \text{ points if } x \in I_3 \\ 14 \text{ points if } x \in I_4 \\ 16 \text{ points if } x \in I_5 \end{cases}$$

Note that for this example, the mapping can be determined based only on knowledge about the possible range of the data values and without consideration of the actual values of the data to be displayed.

EXAMPLE 3

The range $R_d$ may be known a priori to lie within a finite ordered set with high probability. For example, the patient weight in the control group can be expected to fall within the range of 75 to 250 pounds with high probability. It is possible that over time, one or more patients may deviate from this likely range, but such an occurrence would be considered highly abnormal. However, the display method should allow for the possibility that values outside the expected range may occur, and should convey them accordingly. Thus, the first interval of the weight data extends to the lowest possible value of 0 (highly unlikely, probably representing a data error) with the last interval extended to cover infinitely large positive values. In this case, one might partition the possible range into intervals as follows:

$I_1$={x:x≦74}
$I_2$={x:74<x≦100}
$I_3$={x:100<x<150}
$I_4$={x:150<x<200}
$I_5$={x:200<x<250}
$I_6$={x:x>250}

A reasonable mapping of patient weight data to colors might be $I_1$→red
$I_2$→yellow
$I_3$→green
$I_4$→blue
$I_5$→purple
$I_6$→black In STEP 6, for each cell in the n-dimensional table to be displayed, the data values to be conveyed by each aspect of that cell are determined. This step requires indexing through the combinations of parameter values defining the axes of the n-dimensional table, and for each combination of parameter values extracting the corresponding data element from one or more of the n-dimensional tables, and/or applying one or more information functions to compute data values corresponding to the combination of parameter values.

As a concrete example, when displaying a 2-dimensional table, one commonly uses two nested loops, wherein the outer loop indexes through the row tables ($I_1$) and the inner loop indexes through the column tables ($I_2$). For each combination row $\epsilon I_1$ and column $\epsilon I_2$, and each of the k information sets $f_1, f_2, \ldots, f_k$, the values $f_k$(row, column) are computed. For n-dimensional data, n-nested loops are required, wherein the outer-most loop indexes through the parameter range $I_1$, the second-outer-most loop indexes through the parameter range $I_2$, the third-outer-most loop indexes through the parameter range $I_3$, and in general the i-th outer-most loop indexes through the parameter set $I_i$. For each combination of parameter $(x_1, x_2, \ldots, x_n)$ having $X_i \epsilon I_i$ for $i=1,2,\ldots,n$ and each of the data functions $f_k$ the data values $f_k(x_1, x_2, \ldots, x_n)$ may be computed.

STEP 7 uses the the values $f_k(x_1, x_2, \ldots, x_n)$ that were computed in STEP 6 and the mappings that were determined in STEP 5, to determine the values to be displayed by each aspect of each cell. This step requires only applying previously specified mappings to previously computed data values. The details of the implementation are straightforward.

We now turn our attention to details of the present invention in its second aspect, namely, as apparatus, in and of itself, and as apparatus for a preferred realization of the method of the present invention. To this end, we reference FIGS. 3–6, and note that in each figure, the four articulated steps of the method are mapped to relevant hardware or functional modules of the computer apparatus.

In general, the class of computers known as Von Neuman computers comprise a memory, a bus, zero or more input/output devices, and a processing unit containing an arithmetic/logic unit, a control unit, and a program counter. The program counter may be considered to be part of the control unit. The bus connects the memory, the input/output (I/O) devices, and the control unit. See FIG. 3, numerals 14–22.

Figure 3:
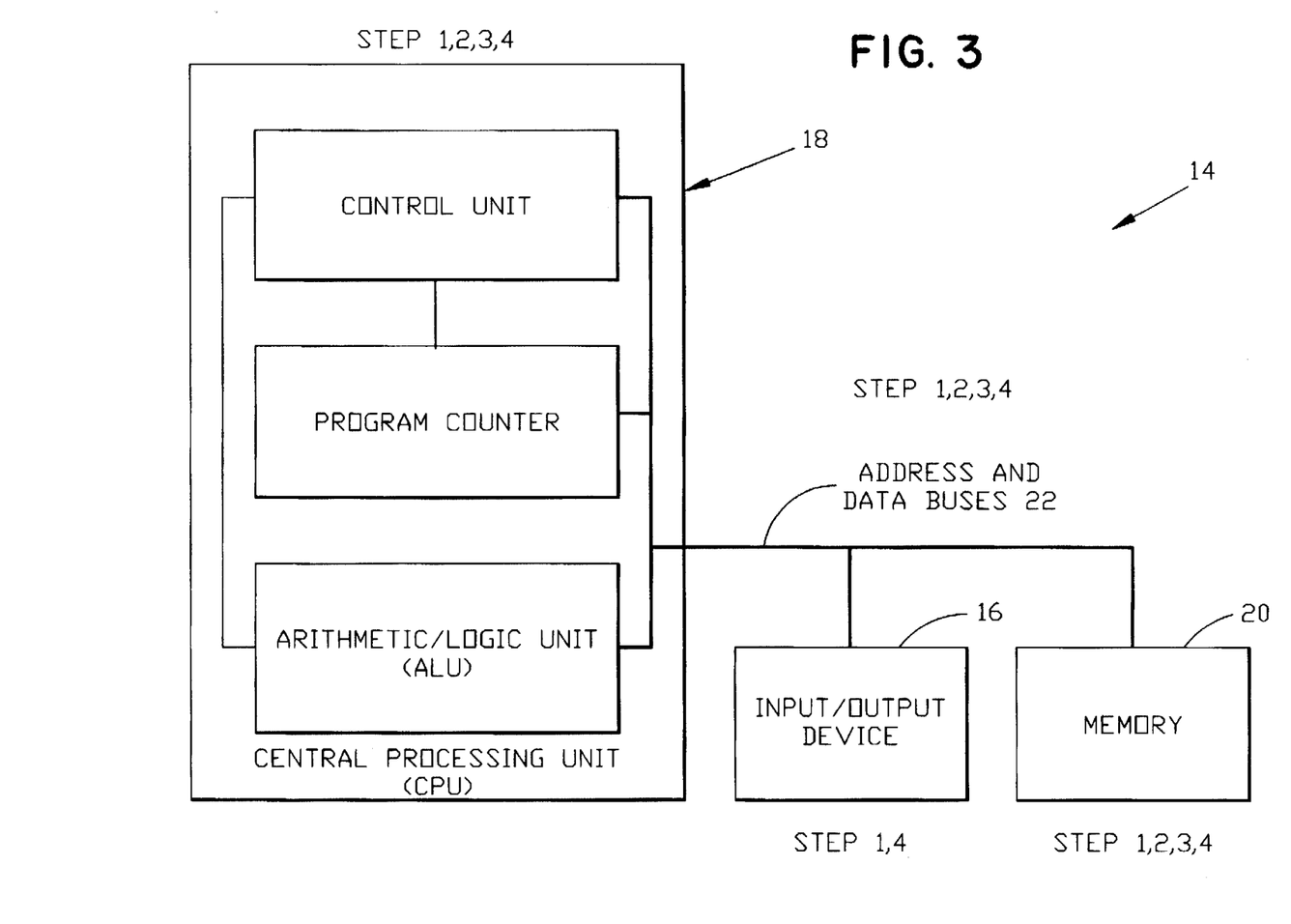
FIGS. 3–6 show various computer architectures in realization of an apparatus of the present invention.
Figure 4:
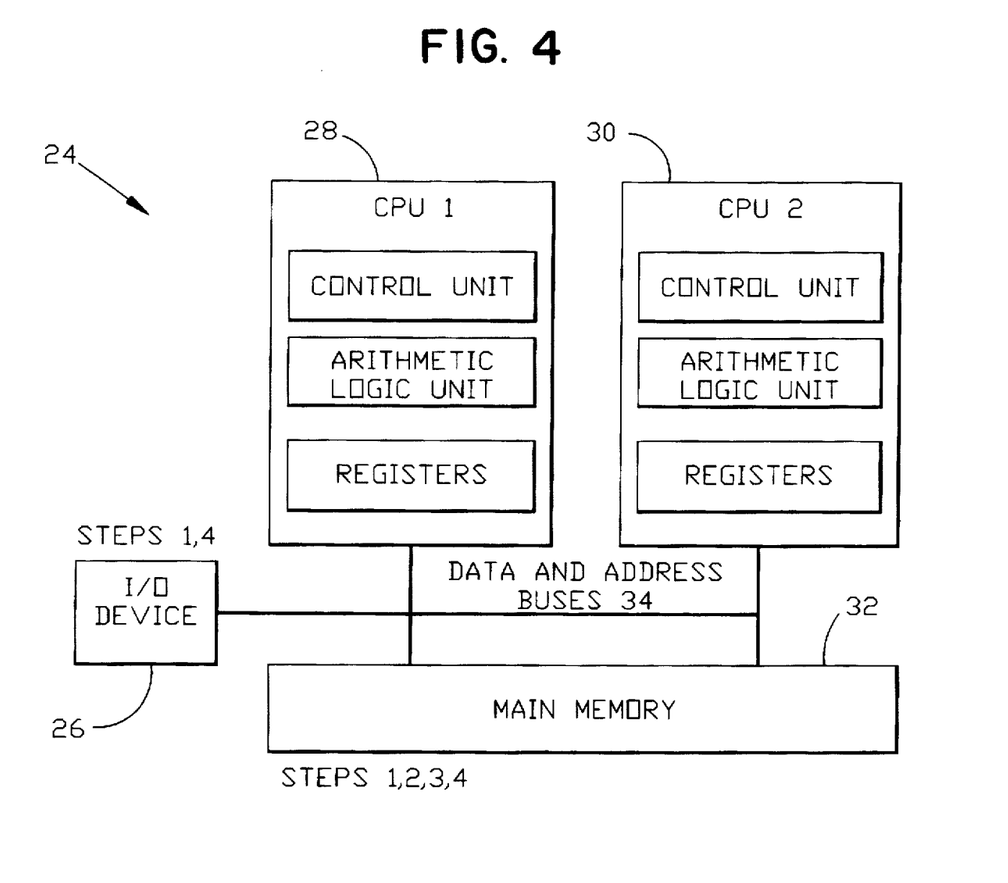
Figure 5:
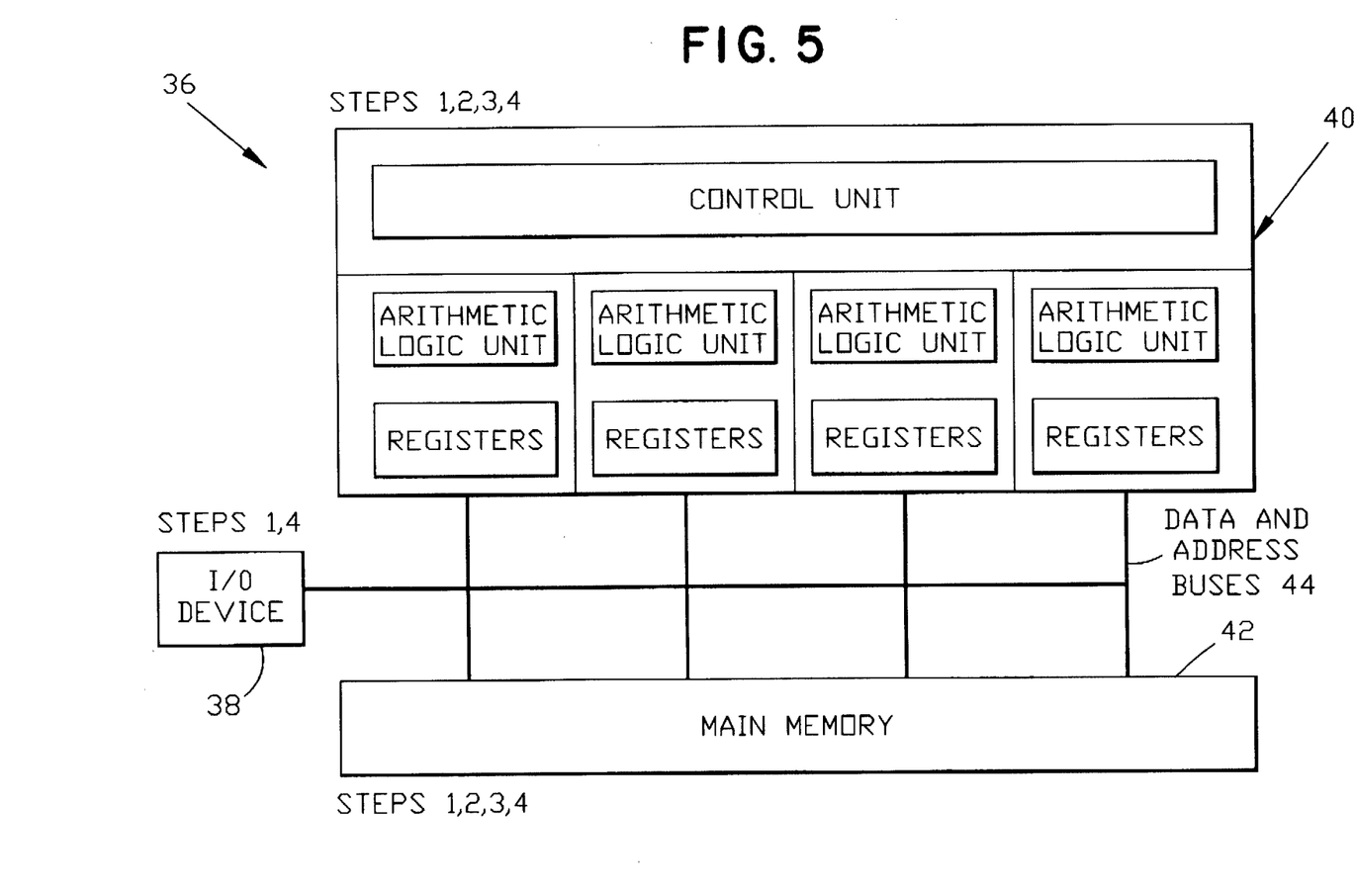
Figure 6:
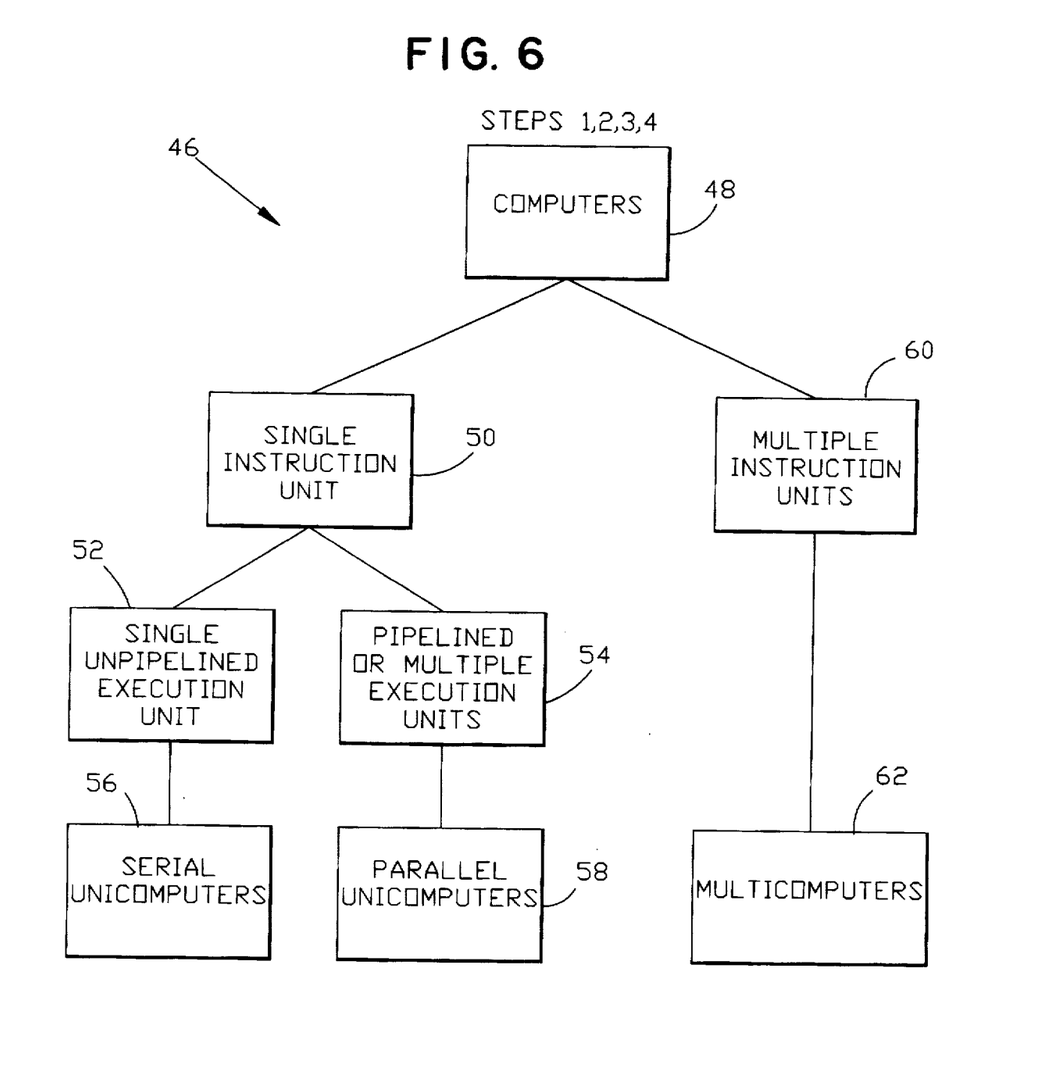

The FIG. 3 memory contains storage locations that have addresses. The addresses are usually numerical. Data at each storage location can be read and, usually, written. Every Von Neuman machine has some memory that can be written, while some of the memory may be read-only.

The bus is able to represent the address of a memory location, the contents of a memory location, and whether the memory location is to be written or read. It may also be able to represent conditions such as changes in the status of I/O devices.

The I/O devices are able to receive instructions via the bus, are able to send status information via the bus, and are able to receive data from the bus and write data on the bus when signalled to do so by the bus. The I/O devices may be able to control the bus, but this is not required. Input devices are able to read data stored in the devices or read from external media and place that data on the bus. Output devices are able to write data from the bus to storage in the device or to external media. Some I/O devices are able to do both.

The processing unit (which may also be referred to as a central processing unit, CPU, or microprocessor), comprises an arithmetic/logic unit, a program counter and a control unit (which may also be referred to as an instruction unit). The control unit is what distinguishes Von Neuman computers from calculators.

The processing unit is able to put addresses on the bus, read data from the bus, and write data to the bus. In this way, the processing unit is able to cause data to be read from specified memory locations or I/O devices or write data to specified memory locations or I/O devices.

The processing unit is able to read data from memory locations and treat the data as instructions that control the actions of the control unit and arithmetic/logic unit. At any point in time alter the initialization of the computer, the program counter will contain the address of a memory location. In the computer's Instruction Cycle, the processing unit will read the instruction stored at the location specified by the program counter, increment the address in the program counter so that it contains the address of the instruction in memory that follows the instruction just read, and execute the instruction just read.

The processing unit generally has a relatively small amount of storage which can represent the contents of one or more memory locations. This storage is referred to as the register or registers.

The instruction can cause any of the following to happen:

read data from memory or an I/O device into a register;

write data from a register to memory I/O device;

perform an arithmetic or logic calculation using data in one or more registers and/or (optionally) memory locations or I/O devices and writing the result to a register or (optionally) memory location or I/O device;

cause the contents of the program counter to be changed, optionally storing the previous value in a register or memory.

Whether the contents of the program counter are changed can be based on the result of an arithmetic or logical calculation or based on a value in a register. This allows different sequences of instructions to be executed.

This describes the fundamental properties of a Von Neuman computer. Many extensions are possible. For example, there may be instructions that read and write memory in one instruction cycle. There may be multiple buses. The I/O devices may be able to take control of the bus (or buses) and read or write data from or to the memory without the processing unit's intervention or assistance. The processing unit may be able to fetch and execute multiple instructions concurrently while providing the abstraction that only one instruction is executed at a time. The computer may provide a virtual memory abstraction, meaning that virtual addresses are mapped to different physical addresses in the memory, allowing programs to use more memory addresses than the computer has in physical memory. (See FIG. 4, numerals 24–34.)

The Von Neuman computer is sometimes referred to as a Single Instruction Single Data computer because, at least in the abstract, it executes one instruction at a time and does zero or one arithmetic/logic calculations at a time.

Other computer architectures take the Von Neuman architecture and extend it by adding arithmetic logic units or whole processing units. (See FIG. 4, FIG. 5, numerals 36–44).

Single Instruction Multiple Data (SIMD) machines execute one instruction at a time (at least in the abstract), but each instruction can cause the same calculation to be done (using data from different registers and/or memory locations) in many different arithmetic/logic units.

Multiple Instruction Multiple Data (MIMD) machines have many processing units and are able to execute many different instructions at the same time. (See FIG. 6, numerals 46–62.)

EXAMPLE TO BE USED THROUGHOUT THE INVENTION

Figure 7:
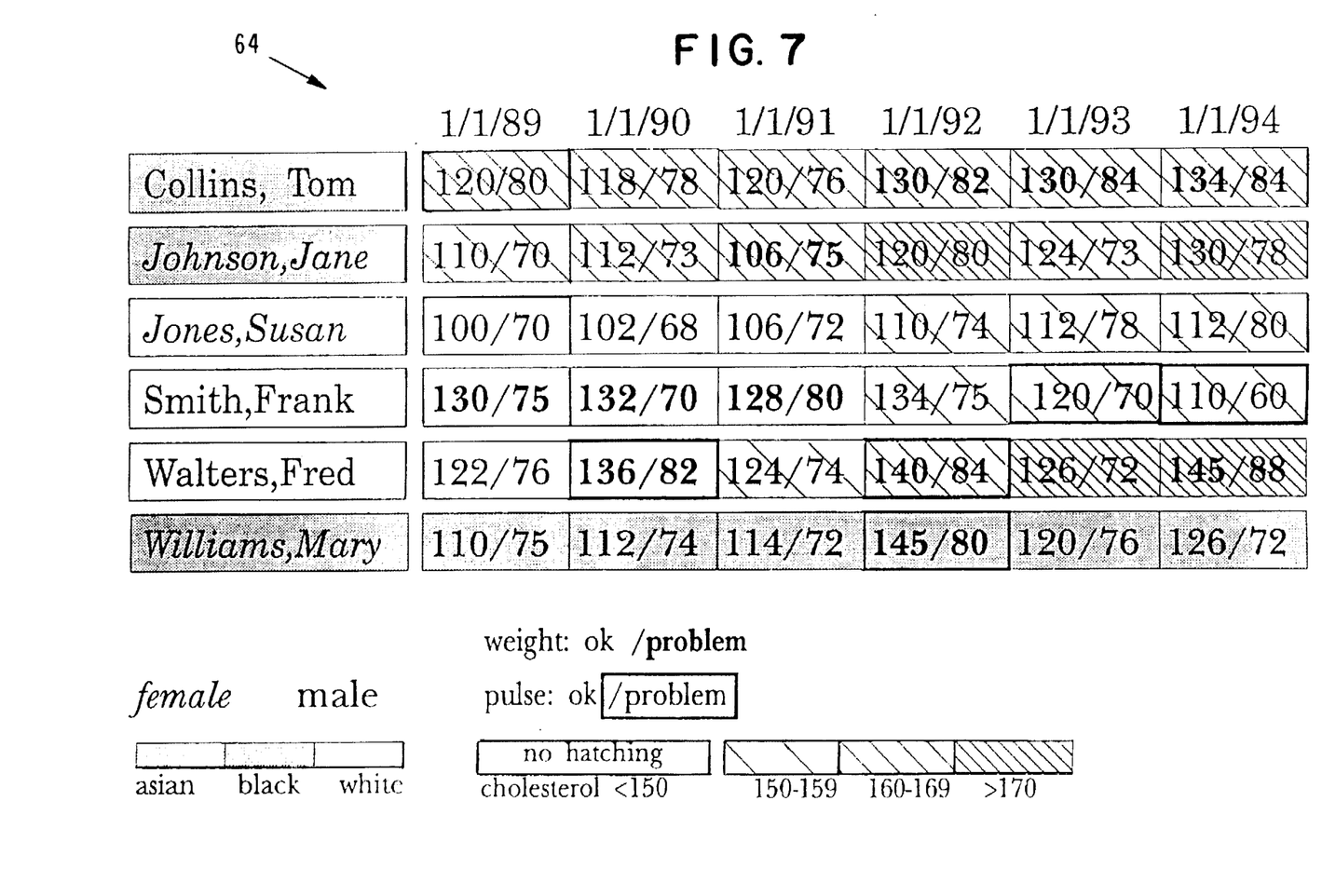
FIG. 7 shows a two-dimensional display developed pursuant to an Example of the present invention.

The following tabular data (Tables 1–8) show several two-dimensional information displays which can be compacted into one two-dimensional information display, as shown in FIG. 7, numeral 64, in accordance with principles of the present invention.

n=2:

dimension 1=people domain={Susan Jones, Tom Collins, Fred Walters, Mary Williams, Frank Smith, Jane Johnson} dimension 2=dates domain={Jan. 1, 1989, Jan. 1, 1998, Jan. 1, 1991, Jan. 1, 1992, Jan. 1, 1993, Jan. 1, 1994} k=9:

functions:

weight(person, date) range=positive integers
height (person, date) range=positive integers
blood pressure (person, date) range={(x,y):x>=y>0}
cholesterol count (person, date) range=non negative integers
resting pulse (person, date) range=positive integers
race(person) range={black, white , asian}
gender(person) range={male, female}
obesity(person, time) range={severely under weight, under weight, normal weight, over weight, obesity} (note: obesity is computed as a function of height and weight, and is not "stored" data)
birthdate (person) range=1900–1950 aspect=contents (alphnumeric strings or images) boundry content color background color font (if content=alpha numeric strings) and so on

DATA

TABLE 1

| | WEIGHT (lbs) | | | | | |
|---|---|---|---|---|---|---|
| | 1/1/89 | 1/1/90 | 1/1/91 | 1/1/92 | 1/1/93 | 1/1/94 |
| Susan Jones | 110 | 112 | 114 | 116 | 118 | 120 |
| Tom Collins | 150 | 150 | 150 | 170 | 170 | 170 |
| Fred Walters | 165 | 180 | 160 | 190 | 155 | 200 |
| Mary Williams | 100 | 100 | 100 | 140 | 110 | 110 |
| Frank Smith | 180 | 180 | 180 | 170 | 160 | 150 |
| Jane Johnson | 100 | 95 | 80 | 95 | 95 | 95 |

TABLE 2

| | HEIGHT (inches) | | | | | |
|---|---|---|---|---|---|---|
| | 1/1/89 | 1/1/90 | 1/1/91 | 1/1/92 | 1/1/93 | 1/1/94 |
| Susan Jones | 61 | 61 | 62 | 64 | 64 | 64 |
| Tom Collins | 66 | 66 | 66 | 66 | 66 | 66 |
| Fred Walters | 68 | 70 | 71 | 71 | 71 | 71 |
| Mary Williams | 66 | 66 | 66 | 66 | 66 | 66 |
| Frank Smith | 72 | 72 | 72 | 72 | 72 | 72 |
| Jane Johnson | 60 | 60 | 60 | 60 | 60 | 60 |

TABLE 3

| | BLOOD PRESSURE | | | | | |
|---|---|---|---|---|---|---|
| | 1/1/89 | 1/1/90 | 1/1/91 | 1/1/92 | 1/1/93 | 1/1/94 |
| Susan Jones | 100/70 | 102/68 | 106/72 | 110/74 | 112/78 | 112/80 |
| Tom Collins | 120/80 | 118/78 | 120/76 | 130/82 | 130/84 | 134/84 |
| Fred Walters | 122/76 | 136/82 | 124/74 | 140/84 | 126/72 | 145/88 |
| Mary Williams | 110/75 | 112/74 | 114/72 | 145/80 | 120/76 | 126/72 |
| Frank Smith | 130/75 | 132/70 | 128/80 | 134/75 | 120/70 | 110/60 |
| Jane Johnson | 110/70 | 112/73 | 106/75 | 120/80 | 124/73 | 130/78 |

TABLE 4

| | Cholesterol Count | | | | | |
|---|---|---|---|---|---|---|
| | 1/1/89 | 1/1/90 | 1/1/91 | 1/1/92 | 1/1/93 | 1/1/94 |
| Susan Jones | 124 | 135 | 145 | 157 | 160 | 160 |
| Tom Collins | 130 | 128 | 130 | 124 | 126 | 130 |
| Fred Walters | 140 | 145 | 150 | 167 | 182 | 205 |
| Mary Williams | 130 | 135 | 130 | 132 | 134 | 133 |
| Frank Smith | 145 | 147 | 145 | 157 | 152 | 155 |
| Jane Johnson | 160 | 165 | 167 | 178 | 165 | 179 |

TABLE 5

| | resting pulse | | | | | |
|---|---|---|---|---|---|---|
| | 1/1/89 | 1/1/90 | 1/1/91 | 1/1/92 | 1/1/93 | 1/1/94 |
| Susan Jones | 72 | 76 | 76 | 78 | 76 | 72 |
| Tom Collins | 68 | 69 | 67 | 71 | 72 | 72 |
| Fred Walters | 75 | 81 | 76 | 82 | 73 | 74 |
| Mary Williams | 66 | 70 | 70 | 85 | 75 | 76 |
| Frank Smith | 70 | 69 | 68 | 70 | 87 | 90 |
| Jane Johnson | 68 | 70 | 72 | 68 | 73 | 71 |

TABLE 6

| | race |
|---|---|
| Susan Jones | white |
| Tom Collins | asian |
| Fred Walters | white |
| Mary Williams | black |
| Frank Smith | white |
| Jane Johnson | asian |

TABLE 7

| | sex |
|---|---|
| Susan Jones | female |
| Tom Collins | male |
| Fred Walters | male |
| Mary Williams | female |
| Frank Smith | male |
| Jane Johnson | female |

TABLE 8

| | birthdate |
|---|---|
| Susan Jones | 1973 |
| Tom Collins | 1960 |
| Fred Walters | 1972 |
| Mary Williams | 1959 |
| Frank Smith | 1956 |
| Jane Johnson | 1952 |

What is claimed:

1. Computer apparatus comprising:

1) means for specifying n (integer) independent information dimensions, wherein each dimension comprises a parameter associated with data comprising an original content and an associated relationship between content in different data elements to be displayed in a two-dimensional display medium;

2) means for specifying k≧2 (integer) data functions defined on subsets of the n information dimensions, wherein each of the k≧2 data functions comprises a range of possible values;

3) means for associating at least one of the k≧2 functions with one or more aspects of the two-dimensional display medium, wherein each aspect comprises a range of possible values that can be displayed on that aspect; and for each aspect 4) means for mapping the range of the functions associated with that aspect to the range of values that can be displayed on that aspect on the two-dimensional display medium so that the original content and relationship of the different data elements are retained invariantly;

and 5) a two-dimensional output display for displaying the data.

2. Computer apparatus according to claim 1, comprising means for specifying a data function, such that when given the input parameter values, the data function generates an output value.

3. Computer apparatus according to claim 1, comprising means for mapping the range of functions for importing a pre-defined signification.

* * * * *